United States Patent Office 3,523,914
Patented Aug. 11, 1970

3,523,914
HYDROCARBON CONVERSION PROCESS
AND CATALYST THEREFOR
Roy T. Mitsche, Island Lake, and Ernest L. Pollitzer, Skokie, Ill., assignors to Universal Oil Products Company, Des Plaines, Ill., a corporation of Delaware
No Drawing. Filed Apr. 24, 1968, Ser. No. 723,896
Int. Cl. C10g 35/08; B01j 11/40
U.S. Cl. 252—455         9 Claims

ABSTRACT OF THE DISCLOSURE

A catalytic composite comprising a platinum group metallic component and a rhenium component combined with a carrier material containing alumina and a finely divided crystalline aluminosilicate, is provided. A specific example of the catalytic composites disclosed herein is a composite containing 0.05 to 1.0 wt. percent platinum and 0.05 to 1.0 wt. percent rhenium, combined with a gamma-alumina carrier material having 0.5 to 20 wt. percent of the hydrogen form or mordenite uniformly distributed therethrough. Principal utility of these catalytic composites is, broadly, in the field of processes for the conversion of hydrocarbons and, more particularly, in a process for the production of LPG and a high octane reformate.

---

The subject of the present invention is a novel catalytic composite which has an exceptional activity and resistance to deactivation when employed in hydrocarbon conversion processes that require a catalyst having a hydrogenation-dehydrogenation function coupled with a selective cracking function. More particularly, the present invention relates to a class of catalytic composites containing a platinum metallic component and a rhenium component combined with an alumina carrier material having a crystalline aluminosilicate distributed uniformly therethrough, and to the use of these composites in the conversion of hydrocarbons.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Group V through VIII of the Periodic Table to which are generally attributed the hydrogenation-dehydrogenation function.

These catalytic compositions are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts is in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used— that is, the temperature, pressure, contact time and presence of diluents such as $H_2$; (2) selectivity refers to the weight percent of the reactants that are converted into the desired product and/or products; (3) stability refers to the rate of change of the activity and selectivity parameters—obviously the smaller rate implying the more stable catalyst.

As is well-known to those skilled in the art, the principal cause of observed deactivation or instability of these dual-function catalysts when they are used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst reducing its activity by shielding its active sites from the reactants. In other words, the performance of this dual-function catalyst is sensitive to the presence of carbonaceous deposits on the surface of the catalyst. Accordingly, the major problem facing workers in this area of the art is the development of a more active and selective catalytic composite that is not as sensitve to the presence of these carbonaceous materials and/or have the capacity to suppress the rate of the formation of these carbonaceous materials on the catalyst. Viewed in terms of performance parameters, the problem is to develop a dual-function catalyst having superior activity, selectivity, and stability when employed in the particular hydrocarbon conversion process of interest.

We have now found a dual-function catalytic composite which possesses improved performance characteristics when it is employed in a process for the conversion of hydrocarbons of the type which have heretofore utilized dual-function catalytic composites, such as processes for isomerization, hydroisomerization, dehydrogenation, hydrogenation, alkylation, dealkylation, cyclization, dehydrocyclization, cracking, hydrocracking, reforming, and the like processes. In particular, we have determined that a combination of a platinum group metallic component and a rhenium component when composited with a carrier material containing alumina and a finely divided crystalline aluminosilicate enables the performance of hydrocarbon conversion processes utilizing dual-function catalysts to be substantially improved. Moreover, in the particular case of a reforming process, we have observed that this novel catalyst is more active and allows the operation to be conducted at a lower average severity level. In addition, this catalyst allows a reforming process to be used to produce substantial quantities of LPG.

In one embodiment, the present invention relates to a catalytic composite comprising a platinum group metallic component and a rhenium component combined with a carrier material containing alumina and a finely divided aluminosilicate. The components are present in the composite in amounts sufficient to result in a final catalytic component containing, on an elemental basis, about 0.05 to about 1.0 wt. percent platinum group metal, and about 0.05 to about 1.0 wt. percent rhenium.

A second embodiment relates to the catalytic composite of the first embodiment wherein the crystalline aluminosilicate comprises about 0.5 to about 20 wt. percent of the carrier material.

A third embodiment relates to the catalytic composite of the second embodiment wherein the crystalline aluminosilicate is the hydrogen form of mordenite.

A fourth embodiment relates to the catalyst composite of the first embodiment wherein the crystalline aluminosilicate is acid-extracted mordenite having a $SiO_2/Al_2O_3$ ratio substantially greater than 10.

Another embodiment relates to a process for the conversion of a hydrocarbon comprising contacting the hydrocarbon and hydrogen with the catalytic composite of the first embodiment at hydrocarbon conversion conditions.

Still another embodiment is a process for the production of LPG and a high octane reformate wherein a gasoline fraction and hydrogen are contacted with the catalytic composite of the third embodiment at LPG-production conditions.

Other embodiments of the present invention relate to the specifics regarding preferred catalytic ingredients, concentration of components in the catalyst, suitable methods of catalyst preparation, operating contitions for use in the hydrocarbon conversion processes, and the like particulars which are hereinafter given in the following detailed discussion of each of these facets of the present invention.

As indicated above, the catalyst of the present invention comprises a carrier material containing alumina and a crystalline aluminosilicate having combined therewith a platinum group component and a rhenium component. In addition, in some cases, the composite may contain a halogen and/or a sulfur component. Considering first the alumina utilized in the present invention, it is preferred that the alumina be a porous, adsorptive, high surface area material having a surface area of about 25 to about 500 or more $m.^2/gm$. Suitable alumina materials are the crystalline aluminas known as gamma-, eta-, and theta-alumina, with gamma-alumina giving best results. In addition, in some embodiments the carrier material may contain minor proportions of other well-known refractory inorganic oxides such as silica, zirconia, magnesia, etc. However, the preferred carrier material comprises substantially pure gamma-alumina containing a minor proportion of a finely divided crystalline aluminosilicate.

It is an essential feature of the present invention that the carrier material contains a finely divided crystalline aluminosilicate. As is well known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association with them of cations in order to maintain electrical balance in the structure. The molecular sieve property of these materials flows from the uniform size of the pores thereof which can be correlated to the size of the molecules that are present in a mixture of molecules and used to separate molecules having a critical diameter less than or equal to the pore mouths of these crystalline aluminosilicates. For purposes of the present invention, it is preferred to use crystalline aluminosilicates having pore mouths of at least 5 angstroms in cross-sectional diameter, and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably about 300° F., to convert to the hydrogen form. When the crystalline aluminosilicates contain a high mole ratio of silica to alumina (for example, above 5), the material may be directly converted to an acid form in a suitable acid medium.

Although in some cases the polyvalent form of the aluminosilicate may be used in the present invention, it is preferred to use the hydrogen form or a form, for example, the alkali metal form, which is convertible to the hydrogen form during the course of the preferred procedure for incorporation of the crystalline aluminosilicates in the carrier material (explained below).

The preferred crystalline aluminosilicate for use in the present invention are the hydrogen and/or polyvalent forms of synthetically prepared faujasite and mordenite. In fact, we have found best results with synthetic mordenite having an effective diameter of about 6 angstrom units and a mole ratio of silica to alumina of about 9 to 10, and more particularly, the hydrogen form of mordenite.

A particularly preferred crystalline aluminosilicate is acid-extracted mordenite having an $SiO_2/Al_2O_3$ ratio substantially above 10. One method of forming this material involves subjecting the ordinary form of mordenite having a $SiO_2/Al_2O_3$ of about 9 to 10 to the action of a strong acid such as hydrochloric acid, sulfuric acid, hydrofluoric acid, etc., at conditions effecting the removal or extraction of at least a portion of the aluminum from the mordenite. Typically this procedure can be used to obtain mordenite having a $SiO_2/Al_2O_3$ ratio of about 11 or more.

Regarding the method of incorporating the crystalline aluminosilcate into the carrier material, we have found that best results were obtained by adding the CAS directly into an aluminum hydroxylchloride sol prior to its formation in the alumina carrier material. An advantage of this method is the relative ease with which the CAS can be uniformly distributed in the resulting carrier material. Additionally, the sol appears to react with the CAS causing some basic modification of the structure of the resulting material which enables it to have unusual ability to catalyze reactions which depend on carbonium ion intermediates such as cracking, alkylation, isomerization, polymerization, etc.

Accordingly, the preferred method for preparing the carrier material involves the following steps: forming an aluminum hydroxylchloride sol by digesting aluminum in HCl to result in a sol having a weight ratio of aluminum to chloride of about 1.0 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.5 to about 20 wt. percent and, more particularly, about 1.0 to about 10.0 wt. percent. By the expression "finely divided" it is meant that the CAS is used in a particle size having an average diameter of about 1 to about 100 microns, with best results obtained with particles of average diameter of less than 40 microns.

Although not essential, it is preferred that the catalyst also contain a halogen component. Although the precise form of the chemistry of the association of the halogen component with the carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and, particularly, chlorine are preferred to the purposes of the present invention. The halogen may be added to the carrier material in any suitable manner, either during preparation thereof or before or after the addition of the catalytically active metallic components. For example, the halogen may be added, at any stage of the preparation of the carrier material or to the calcined carrier material, as an aqueous solution of an acid such as hydrogen fluoride, hydrogen chloride, hydrogen bromide, etc. The halogen component, or a portion thereof, may be composited with the carrier material during the impregnation of the latter with the platinum group component; for example, through the utilization of a mixture of chloroplatinic acid and hydrogen chloride. In another situation, the aluminum hydroxylchloride hydrosol which is preferably utilized to form the carrier material contains halogen and thus can contribute some portion of the halogen component to the final composite. In any event, the halogen is preferably composited with the carrier material in such a manner as to result in a final composite that contains about 0.1% to about 1.5% and more preferably about 0.4 to about 0.9% by weight of halogen calculated on an elemental basis.

It is essential that the catalyst contain a platinum group metallic component. Although the process of the present invention is specifically directed to the use of a catalytic composite containing platinum or palladium, it is intended to include other platinum group metals such as rhodium, ruthenium, etc. The platinum group metallic component, such as platinum or palladium may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.05 to about 1.0% by weight of the final catalytic composite calculated on an elemental basis. Excellent results are obtained when the catalyst contains about 0.3 to about 0.9 weight percent of the platinum group metal.

The platinum group metatllic component may be incorporated in the catalytic composite in any suitable manner such as coprecipitation or cogellation with the alumina carrier material, ion-exchange with the alumina hydrogel, or impregnation either after or before calcination of the alumina hydrogel, etc. The preferred method of incorporating this component involves the utilization of water soluble compounds of the platinum group metals with which the carrier material is combined by an impregnation technique. Thus, the platinum group metal may be added to the carrier material by commingling the latter with an aqueous solution of chloroplatinic acid. Other water-soluble compounds of platinum may be employed as impregnation solutions and include ammonium chloroplatinate, platinum chloride, dinitro diamino platinum, etc. The utilization of a platinum chloride compound, such as chloroplatinic acid, is preferred since it facilitates the incorporation of both the platinum component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases it may be advantageous to impregnate the support when it is in a gelled state. Following the impregnation, the resulting impregnated support is dried and subjected to a high temperature calcination or oxidation technique at a temperature of 850° F. to about 1100° F.

Another essential constituent of the catalyst is the rhenium component. This component may be present as an elemental metal, as a chemical compound, such as the oxide, sulfide, halide, or in a physical or chemical association with the alumina carrier material and/or the other components of the catalyst. Generally, the rhenium component is utilized in an amount sufficient to result in a final catalytic composite containing about 0.05 to about 1.0 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the carrier material either before, during, or after the other components referred to above are added. The impregnation solution can, in some cases, be an aqueous solution of a suitable rhenium salt such as ammonium perrhenate, sodium perrhenate, potassium perrhenate and the like salts. In addition, aqueous solutions of rhenium halides such as the chlorides may be used if desired; however, the preferred impregnation solution is an aqueous solution of perrhenic acid. In general, the rhenium component can be impregnated either prior to, simultaneously with, or after the platinum group metallic component is added to the carrier material. However, we have found that best results are achieved when the rhenium component is impregnated simultaneously with the platinum group metallic component. In fact, we have determined that an especially preferred impregnation solution contains chloroplatinic acid, hydrogen chloride and perrhenic acid.

In addition, we have determined that an especially preferred catalytic composite is prepared when the weight ratio, calculated on an elemental basis, of the rhenium component to the platinum group metallic component is selected from the range of about 0.05:1 to about 2.75:1. This is particularly true when the total weight content of the rhenium component plus the platinum group metallic component in the catalytic composite is fixed in the range of about .2 to about 1.5 wt. percent and more preferably about .4 to about 1.0, calculated on an elemental basis. Accordingly, examples of especially preferred catalytic composites are composites containing: .1 wt. percent Re+.65 wt. percent Pt, .2 wt. percent Re+.55 wt. percent Pt, .375 wt. percent Re+.375 wt. percent Pt, 0.55 wt. percent Re+0.20 wt. percent Pt, and 0.65 wt. percent Re+0.10 wt. percent Pt.

Regardless of the details of how the components of the catalyst are composited with the alumina carrier material, the final catalyst generally will be dried at a temperature of from about 200° F. to about 600° F. for a period of from about 2 to 24 hours or more and finally oxidized at a temperature of about 700° F. to about 1100° F. for a period of about 0.5 to 10 hours, and preferably about 1 to about 5 hours. This oxidation step is preferably performed in the presence of air having a minor amount of chloride present therein.

It is preferred that the resultant calcined catalytic composite be subjected to a substantially water-free reduction prior to its use in the conversion of hydrocarbons. This step is designed to insure a uniform and finely divided dispersion of the metallic component throughout the alumina carrier material. Preferably, substantially pure and dry hydrogen (i.e. less than 5 vol. p.p.m. $H_2O$) is used as the reducing agent in this step. The reducing agent is contacted with the calcined catalyst at a temperature of about 800° F. to about 1200° F. and for a period of time of about 0.5 to about 10 hours or more effected to substantially reduce both metallic components to their elemental state. This reduction treatment may be performed in situ as part of a start-up sequence if precautions are taken to predry the plant to a substantially water-free state and if substantially water-free hydrogen is used.

Although it is not essential, the resulting reduced catalytic composite may, in many cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more.

According to the present invention, a hydrocarbon charge stock and hydrogen are contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed, into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst with best results obtained in the vapor phase.

In the cases where the catalyst of the present invention is used in a reforming process or a process for the production of LPG and a high octane reformate, the conversion system will comprise a conversion zone containing a fixed bed of the catalyst type previously characterized. This conversion zone may be one or more separate reactors with suitable heating means therebetween to compensate for the endothermic nature of the reactions that take place in each catalyst bed. The hydrocarbon feed stream that is charged to this conversion system in the reforming and LPG-production embodiments will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods to remove substantially all sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock, or a n-hexane-rich stock, etc. In hydrocracking embodiments, the charge stock will be typically a gas oil, heavy cracked cycle oil, etc. In addition alkyl aromatics can be conveniently isomerized by using the catalyst of the present invention. Likewise, pure hydrocarbons or substantially pure hydrocarbons can be converted to more valuable products by using the catalyst of the present invention in any of the hydrocarbon conversion processes, known to the art, that use a dual-function catalyst.

In the reforming and LPG-production embodiments, an effluent stream is withdrawn from the conversion zone and passed through a condensing means to a separation zone, typically maintained at about 50° F. wherein a hydrogen-rich gas is separated from a high octane liquid product, commonly designated as a reformate. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e. liquified petroleum gas) and other light ends and to produce a high octane reformate.

The conditions utilized in the numerous hydrocarbon conversion embodiments of the present invention are those customarily used in the art for the particular reaction, or combination of reactions, that is to be effected. For instance, alkylaromatic isomerization conditions include: a temperature of about 32° F. to about 1000° F.; a pressure at atmospheric to about 1500 p.s.i.g.; hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.5 hr.$^{-1}$ to 20 hr.$^{-1}$. Likewise typical hydrocracking conditions include: a pressure of about 500 p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of 1000 to 10,000 s.c.f. per barrel of charge.

Conditions utilized in the embodiment of the present invention when substantial quantities of LPG and a high octane reformate are to be produced include: a pressure of about 400 to about 600 p.s.i.g., a temperature of about 800 to about 1050° F., a LHSV of about 0.5 to 5.0 hr.$^{-1}$ and a hydrogen to hydrocarbon mole ratio of about 5:1 to 10:1.

The following examples are given to illustrate further the preparation of the catalyst composite of the present invention and the use thereof in the conversion of hydrocarbons. It is understood that the examples are given for the sole purpose of illustration and are not to be considered to limit unduly the generally broad scope and spirit of the appended claims.

EXAMPLE I

Aluminum metal, having a purity of 99.99 wt. percent is digested in hydrochloric acid to produce an aluminum hydroxylchloride sol having a weight ratio of Al/Cl of about 1.15 and a specific grafity of 1.3450. An aqueous solution containing 28 wt. percent HMT (i.e. hexamethylenetetramine) is made up, and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. percent $Al_2O_3$, 87.7 wt. percent $SiO_2$ and 0.2 wt. percent Na. Still another portion of the mordenite is analyzed for particle size distribution. The results show that 57.6 wt. percent of the powder is between 0 to 40 microns in size and 82.1 wt. percent of the powder is between 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about 1/16 inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 gm./cc.

About 350 cc. of the carrier material is placed in a steam jacketed rotating vessel and 250 cc. of an impregnation solution containing chloroplatinic acid, perrhenic acid and HCl is added thereto. The vessel is rotated until all the liquid solution is evaporated. The catalyst particles are then oxidized at a temperature of about 1025° F. to produce a finished catalyst containing, on an elemental basis, 0.55 wt. percent platinum, about 0.75 wt. percent chloride and about 0.2 wt. percent rhenium, combined with an alumina carrier material containing about 5 wt. percent of the hydrogen form of the mordenite-type crystalline aluminosilicate.

EXAMPLE II

A portion of the catalyst produced by the method of Example I is placed in a fixed bed isomerization plant of conventional design. Substantially pure isopropylbenzene is used as the charge stock. The charge stock is commingled with about 8 moles of $H_2$ per mole of hydrocarbon, heated to about 480° C., and charged to the reactor containing the catalyst which is maintained at about a pressure of about 300 p.s.i.g. Substantial conversion of isopropylbenzene to trimethylbenzene is obtained.

EXAMPLE III

Another portion of the catalyst of Example I is used to isomerize normal butane at a pressure of 300 p.s.i.g., a temperature of 225° C., a hydrogen to hydrocarbon mole ratio of about 0.5:1 and a LHSV of about 1.0 hr.$^{-1}$. Substantial isomerization of n-butane to isobutane is noted at these conditions—approximately a conversion of n-butane to isobutane of about 48 wt. percent of charge.

EXAMPLE IV

Another portion of catalyst of Example I is loaded into a continuous fixed-bed reforming system of conventional design. A heavy Kuwait naphtha having an initial boiling point of 184° F., an end boiling point of 360° F., an API gravity at 50° F. of 60.4, a paraffin content of 71 vol. percent, a naphthene content of 21 vol. percent and an aromatic content of 8 vol. percent, is charged to the reforming system at conditions including: a LHSV of 1.5 hr.$^{-1}$, a pressure of 200 p.s.i.g., a hydrogen to hydrocarbon mole ratio of about 7:1 and a temperature sufficient to produce a $C_5+$ reformate having an F-1 clear octane number of 96. An effluent stream is withdrawn from contact with the catalyst and a $C_5+$ reformate is recovered therefrom.

Operation is continued for a catalyst life of about 10 b.p.p. (i.e. barrel of charge per pound of catalyst) with an average temperature increase rate of about +0.5° F./b.p.p. and a $C_5+$ vol. percent decline rate of about −0.5 vol. percent/b.p.p. These results manifest the stability feature of the catalyst of the present invention.

EXAMPLE V

Another portion of the catalyst of Example I is subjected to a dry prereduction with hydrogen at a temperature of about 1025° F. The resulting reduced composite is thereafter contacted with a sulfiding gas consisting of a mixture of $H_2$ and $H_2S$ having about 10 moles of $H_2$ per mole of $H_2S$ at a temperature of about 1025° F. and for a period of time sufficient to incorporate about 0.1 wt. percent sulfur in the resulting catalyst.

The resulting prereduced and sulfided catalyst is then loaded into a conventional continuous reforming system and subjected to a test designed to study its LPG production ability.

The charge stock utilized in a Kuwait naphtha having an API gravity of 62.0 at 60° F., an initial boiling point of 172° F., a 50% boiling point of 240° F., and and end boiling point of 362° F. Moreover, it contains an aromatic content of 9.0 vol. percent, a naphthene content of 16.0 and a paraffin content of 75 vol. percent.

Conditions utilized are: a LHSV of 2.0 hr.$^{-1}$, a pressure of 600 p.s.i.g., a hydrogen to hydrocarbon mole ratio of about 5.0:1, and a temperature sufficient to produce a $C_5+$ reformate having an octane number of about 95.0 F-1 clear.

For a catalyst life of about 10 b.p.p. the average yield data is: hydrogen production, 200 s.c.f.b.; $C_1+C_2$ production, 8.3 wt. percent of feed; $C_3+C_4$ production, 27.5 wt. percent of feed; and $C_5+$ yield, 63.9 wt. percent of feed.

The selectivity of the catalyst for LPG production is evidenced by the facts that about 76.0% of the light gas make is LPG and that the LPG make is 27.5 wt. percent of the feed.

We claim as our invention:

1. A catalytic composite comprising about 0.05–1.0 wt. percent of a platinum group metallic component and about 0.05–1.0 wt. percent of a rhenium component combined with a carrier material containing alumina and about 0.5–20.0 wt. percent of finely divided mordenite based on said carrier material, said catalytic composite having been prepared by evenly distributing finely divided mordenite throughout an aluminum hydroxyl chloride sol, gelling the resulting mixture to produce a hydrogel, calcining the resulting hydrogel, and impregnating the calcined hydrogel with said platinum group and rhenium components.

2. The catalytic composite of claim 1 wherein said platinum group metallic component is platinum or a compound of platinum.

3. The catalytic composite of claim 1 wherein said platinum group metallic component is palladium or a compound of palladium.

4. The catalytic composite of claim 1 wherein a halogen component is combined therewith.

5. The catalytic composite of claim 4 wherein said halogen component is chlorine or fluorine.

6. The catalytic composite of claim 1 wherein a sulfur component is combined therewith.

7. The catalytic composite of claim 1 wherein said mordenite is in the hydrogen form.

8. The catalytic composite of claim 1 wherein said mordenite is acid-extracted mordenite having a $SiO_2/Al_2O_3$ ratio substantially above 10.

9. The catalytic composite of claim 1 wherein said alumina comprises gamma-alumina.

References Cited

UNITED STATES PATENTS

| | | | |
|---|---|---|---|
| 3,175,967 | 3/1965 | Miale et al. | 208—120 |
| 3,236,765 | 2/1966 | Erbelding | 208—138 |
| 3,367,885 | 2/1968 | Rabo et al. | 252—455 |
| 3,369,997 | 2/1968 | Hayes et al. | 208—139 |
| 3,376,214 | 4/1968 | Bertolacini et al. | 208—89 |
| 3,397,137 | 8/1968 | Pickert et al. | 208—138 |
| 3,409,685 | 11/1968 | Donaldson et al. | 260—668 |
| 3,409,686 | 11/1968 | Mitsche | 260—668 |
| 3,438,888 | 4/1969 | Spurlock | 208—139 |

HERBERT LEVINE, Primary Examiner

U.S. Cl. X.R.

208—138, 139